United States Patent [19]

Shaffer et al.

[11] Patent Number: 5,903,627
[45] Date of Patent: May 11, 1999

[54] SYSTEM AND METHOD FOR IMPROVING DELIVERY OF MESSAGES TO A MESSAGING SYSTEM

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 08/748,304

[22] Filed: Nov. 13, 1996

[51] Int. Cl.⁶ .................................................... H04M 1/64
[52] U.S. Cl. .................. 379/67.1; 379/88.01; 379/88.12; 379/88.18
[58] Field of Search .............................. 379/67, 88, 89, 379/67.1, 88.01, 88.12, 88.18

[56] References Cited

U.S. PATENT DOCUMENTS

| | | | |
|---|---|---|---|
| 4,757,525 | 7/1988 | Matthews et al. | 379/89 |
| 4,790,003 | 12/1988 | Kepley et al. | 379/88 |
| 5,220,596 | 6/1993 | Patel | 379/94 |
| 5,483,578 | 1/1996 | Ackermann et al. | 379/67 |
| 5,509,061 | 4/1996 | Amereller et al. | 379/207 |
| 5,623,538 | 4/1997 | Petty | 379/67 |

*Primary Examiner*—Fan S. Tsang
*Assistant Examiner*—Allan Hoosain
*Attorney, Agent, or Firm*—Heather S. Vance

[57] ABSTRACT

An improved system and method for delivering messages is provided. A message (18) is created by a messaging system (10) and then sent to a second message mailbox (16). When the second message mailbox (16) is full, the message (18) is then sent to a first message mailbox (14) for storage. The message (18) is later automatically sent from the first message mailbox (14) to the second message mailbox (16) when the second message mailbox (16) is no longer full.

3 Claims, 4 Drawing Sheets

FIG. 2
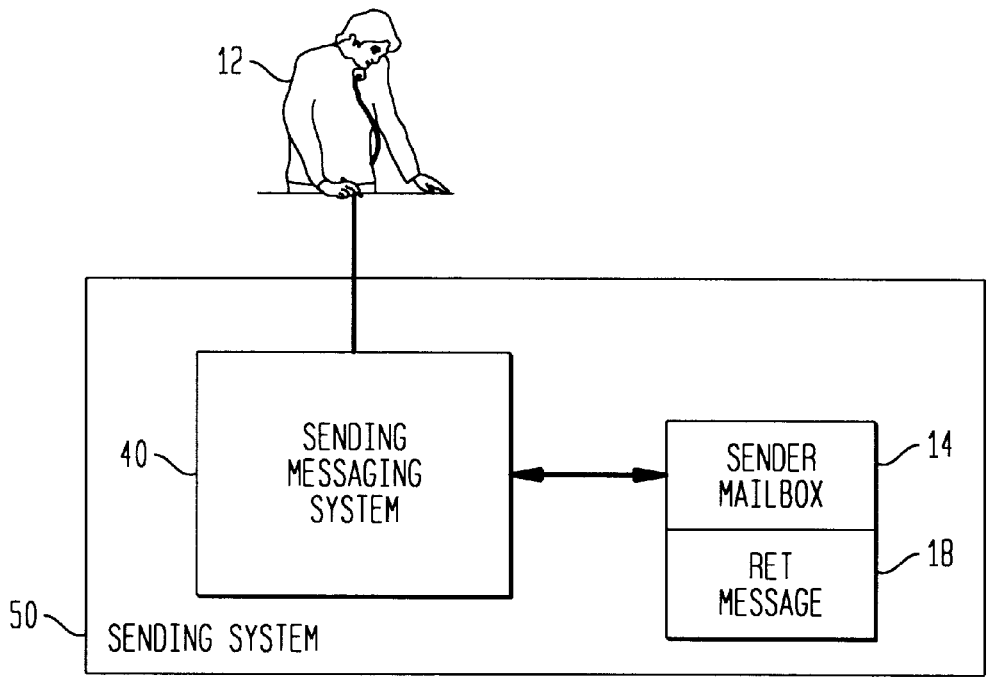
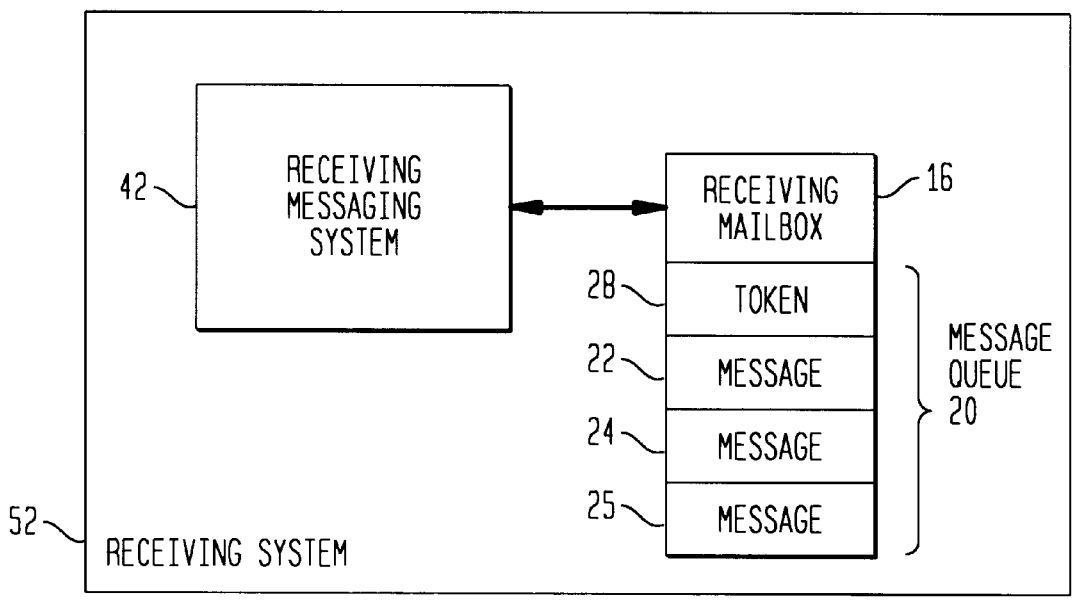

SYSTEM AND METHOD FOR IMPROVING DELIVERY OF MESSAGES TO A MESSAGING SYSTEM

BACKGROUND OF THE INVENTION

1. Field of the Invention

The invention relates to delivering messages to a messaging system, and more particularly to automating the delivery of messages when a receiving message mailbox is full.

2. Description of the Related Art

Most multimedia messaging systems today set a limit on the number of messages which can be stored in a receiving message mailbox (e.g., 10 or 20 voice mail messages). This is done to prevent the system's storage resources from being filled by a few high-volume users. If a message is addressed to a message mailbox which is already full, the message is returned to the sending mailbox. The same result occurs if a message is recorded in the sending mailbox and later sent to the full receiving mailbox. After the message is returned to the sending mailbox, the sender can either delete the message or manually retry to deliver the message. This manual retrying may have to occur again and again until the receiving mailbox is no longer full. Thus, the burden is on the sender to continue retrying to deliver the message.

Some networked messaging systems are programmed to automatically attempt to retry sending a message after that message has been returned from a full message mailbox. In this arrangement, an inefficient retry algorithm is used. The retry may only occur once at a later time, or the retry algorithm may cause the retry to occur every, for example, two hours until the receiving mailbox is no longer full and the message is accepted. In this example, unnecessary retries occur, and the timing of the retries may miss an opportunity for delivery. For example, if a message is deleted from the receiving mailbox and shortly after that another message is sent to the receiving mailbox by a third party, only a short window of time is available for the delivery of the originally returned message. The automatic retry will likely miss this opportunity.

It is desirable to have a system for delivering messages which does not rely on the sender's intervention. Moreover, it is desirable to have a system which efficiently automates message delivery to a receiving mailbox which is full. Finally, it is desirable to have a system which utilizes the full mailbox feature as it was intended to be used to preserve the resources of the messaging system and not to complicate message delivery for the sender.

SUMMARY OF THE INVENTION

According to the invention, an improved system and method for delivering messages is provided. In one embodiment of the present invention, the system checks the state of a receiving mailbox. The receiving mailbox is coupled to a messaging system. When the receiving mailbox is full, a message token is placed in the receiving mailbox. The message token identifies the location of a message which is stored in a sending mailbox. The message is automatically sent from the sending mailbox to the receiving mailbox when the receiving mailbox leaves the full state.

In another embodiment of the present invention, a message is created by a messaging system and then sent to a second message mailbox. When the second message mailbox is full, the message is then sent to a first message mailbox for storage. The message is later automatically sent from the first message mailbox to the second message mailbox when the second message mailbox is no longer full.

BRIEF DESCRIPTION OF THE DRAWINGS

FIG. 2 illustrates a second embodiment of the present invention for off-system messaging;

DETAILED DESCRIPTION

The present invention provides for the automatic delivery of messages when a receiving message mailbox is full. In the preferred embodiment of the invention, a delivery attempted token is placed in the message queue of the full receiving message mailbox and the message is stored in the sending mailbox. This message token points to the location of the message which is still stored in the sending mailbox. When the receiving mailbox is no longer full, the message is automatically transferred out of the sending mailbox and into the receiving mailbox. Thus, the present invention eliminates the need for manual intervention when a receiving mailbox is full.

The present invention can be implemented in, for example, the voice mail, voice messaging environment. In addition, the present invention can be used for any other type of message via any media. For example, e-mail, facsimile and/or video message delivery can utilize the present invention.

Figure 1:
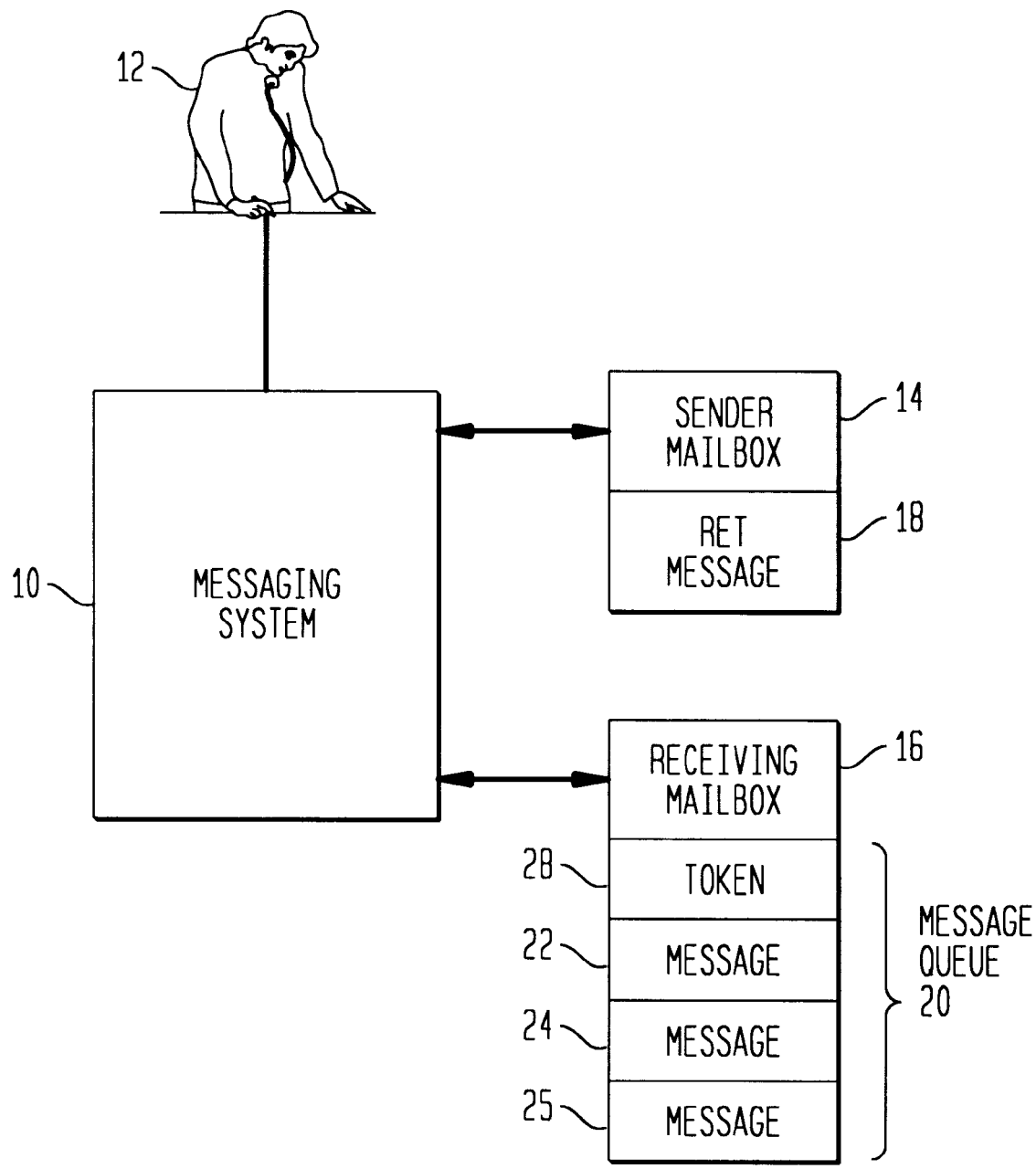
FIG. 1 illustrates a first embodiment of the present invention for same-system messaging.

FIG. 1 illustrates a first embodiment of the present invention for same-system messaging. The example set forth in FIG. 1 involves a voice messaging system 10 which provides messaging services to user/message sender 12. Sender mailbox 14 and receiving mailbox 16 are coupled to messaging system 10. Both sender mailbox 14 and receiving mailbox 16 are, for example, conventional voice messaging system mailboxes. Sender mailbox 14 is assigned to sender 12 such that messages for sender 12 are sent to and stored in sender mailbox 14. In this example, sender mailbox 14 includes returned message 18. Message 18 was returned because message queue 20 in receiving mailbox 16 was full when message 18 was sent from sender 12 to receiving mailbox 16. Message queue 20 includes awaiting messages 22–25 along with message token 28. As set forth above, message token 28 points to the location of returned message 18.

In one embodiment, messaging system 10 monitors the state of receiving mailbox 16 and, when receiving mailbox 16 is no longer full, initiates the request for retransmission of returned message 18. In the preferred embodiment, receiving mailbox 16 reserves a place for returned message 18. Therefore, receiving mailbox 16 does not become full again before the retransmission of returned message 18 is complete. Returned message 18 is then added to message queue 20 in receiving mailbox 18 and message token 28 is deleted. In an alternative embodiment, receiving mailbox 16 monitors its own state and initiates a request for retransmission of returned message 18 when receiving mailbox 16 is no longer full. Again, receiving mailbox 16 preferably reserves a place for returned message 18.

FIG. 2 illustrates a second embodiment of the present invention for off-system messaging. With off-system messaging, sending mailbox 14 and receiving mailbox 16 are associated with different messaging systems 40 and 42. These messaging systems 40 and 42 must share a common protocol which supports the message tokens of the present invention (e.g., the ANIS protocol for networking voice mail messaging systems could be altered to support the message tokens). The common protocol allows for use of the message tokens and for communication between sending messaging system 40 and receiving message system 42.

In this example, token message 28 points to mailbox 14 which is associated with sending messaging system 40. In the preferred embodiment, the request for retransmission of returned message 18 is transmitted by receiving messaging system 42. Receiving messaging system 42 is associated with receiving mailbox 16. Thus, receiving messaging system 42 can monitor the state of receiving mailbox 16. This request for retransmission occurs when receiving mailbox 16 is no longer full. In another embodiment, receiving mailbox 16 monitors its own state and initiates a request for retransmission of returned message 18 when receiving mailbox 16 is no longer full. Receiving mailbox 16 can also reserve a place for returned message 18 such that receiving mailbox 16 does not become full again before the retransmission of returned message 18 is complete.

With the off-system message set forth in FIG. 2, a new class of messaging service can be created. This new messaging service allows for distant retrieval of returned message 18 after receiving mailbox 16 leaves the full status. Therefore, receiving mailbox 16, receiving messaging system 42 or receiving system 52 can initiate a retrieval attempt from a distant sending system 50 when receiving mailbox 16 is no longer full.

In one embodiment of the present invention, returned message 18 has a new type of status. Returned message 18 can be labeled as a message which is awaiting delivery to a full mailbox. The messaging system may even refer to returned message 18 as such when sender 12 reviews the messages in sender mailbox 14. For example, the messaging system may provide the following automated message in relation to returned message 18: "You have two outgoing messages . . . message one, recorded at 2:15 pm on April 20 could not be delivered because the destination mailbox is full. To keep this message for later delivery to John Smith, press 4 now, to cancel delivery of this message, press 6 now." In this example, John Smith is the user associated with the full destination/receiving mailbox.

In the preferred embodiment, the returned message is stored in sender mailbox 14 such that it is owned by and can still be deleted by sender 12 until returned message 18 is retransmitted to receiving mailbox 16. Therefore, the transfer of ownership of returned message 18 is based on the change of status of receiving mailbox 16.

Figure 3:
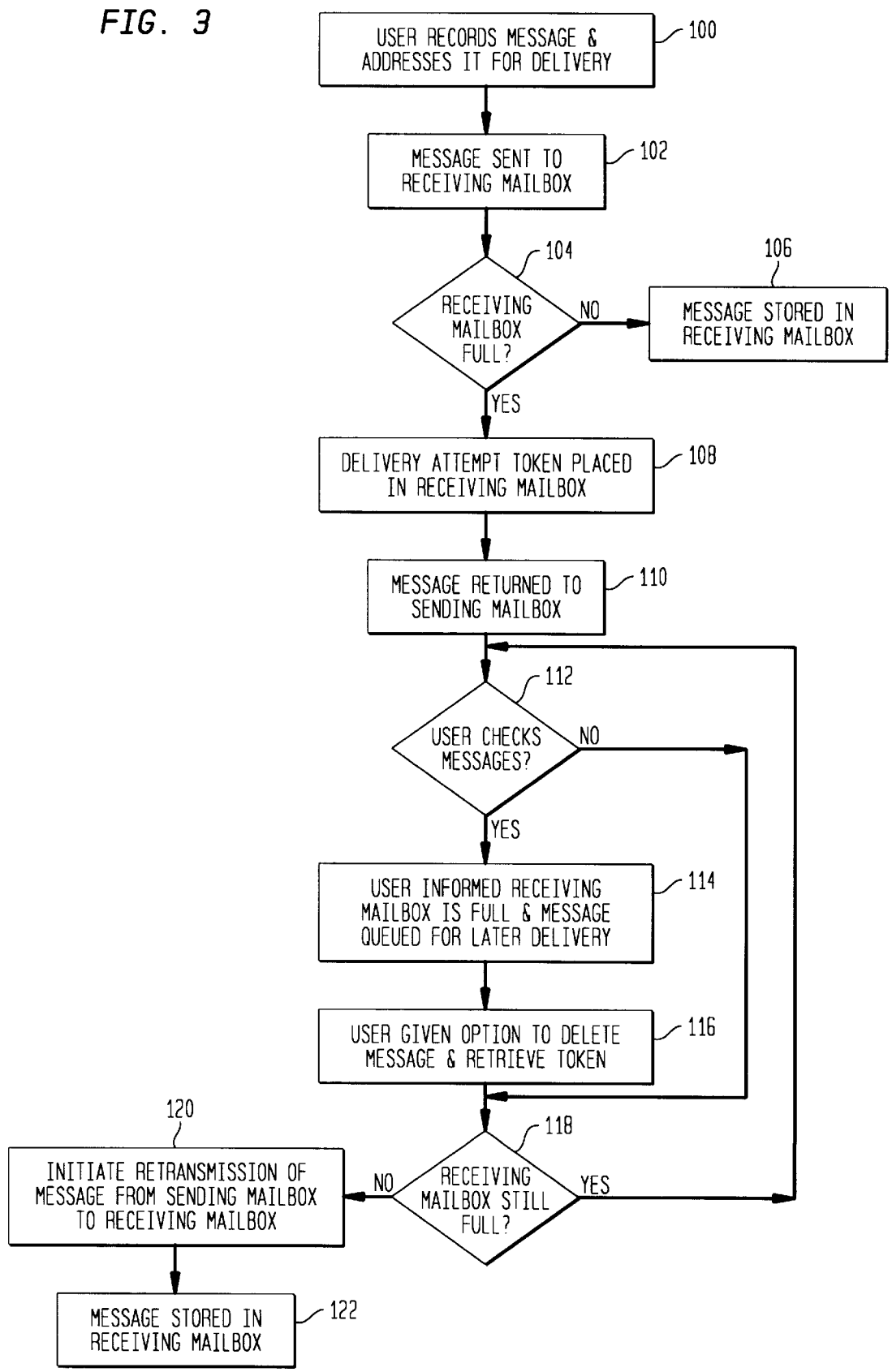
FIG. 3 is a process flowchart for a first embodiment of the present invention for same-system messaging.

FIG. 3 is a process flowchart for a first embodiment of the present invention for same-system messaging. An environment for same-system messaging is set forth in FIG. 1. At step 100, the message sending user records a message and addresses it for delivery. At step 102, the message is sent to a receiving mailbox. As an alternative to steps 100 and 102, the sending user can send a message to the receiving mailbox when the called party does not answer a call from the sending user (the receiving mailbox being associated with the called party). At step 104, the system checks if the receiving mailbox is full. If the receiving mailbox is not full, the message is stored in the queue of messages in the receiving mailbox at step 106. If the receiving mailbox is full, a delivery attempt token is placed in the receiving mailbox message queue at step 108. At step 110, the message is returned to the sending mailbox (the sending mailbox being associated with the sending user). As an alternative, the message can be kept in the sending mailbox while the system checks the status of the receiving mailbox. If the receiving mailbox is full, the message just remains in the sending mailbox.

At step 112, if the message sending user checks for messages, the system moves to step 114. At step 114, the sending user is informed that the receiving mailbox is full and the returned message is queued in the sending mailbox for later delivery. At step 116, the sending user is given the option of deleting the returned message and retrieving the message token from the receiving mailbox. The system then moves to step 118. Returning to step 112, if the sending user does not check for messages, the system moves to step 118. At step 118, the system (e.g., the messaging system) checks if the receiving mailbox is still full. For example, the receiving mailbox is no longer full if a message has been deleted from it. In an alternative embodiment, at step 118, the receiving mailbox takes the initiative and indicates it is no longer full. If the receiving mailbox is still full, the system moves to step 112. If the receiving mailbox has left the full state, the system moves to step 120. At step 120, the receiving mailbox initiates the retransmission of the message from the sending mailbox to the receiving mailbox. In the preferred embodiment, the receiving mailbox also reserves a place for the message in its message queue. In an alternative embodiment, the messaging system monitors the receiving mailbox and initiates the retransmission of the message when the receiving mailbox leaves the full state. At step 122, the message is stored in the message queue of the receiving mailbox. Thus, automatic redelivery of the message is achieved.

Figure 4:
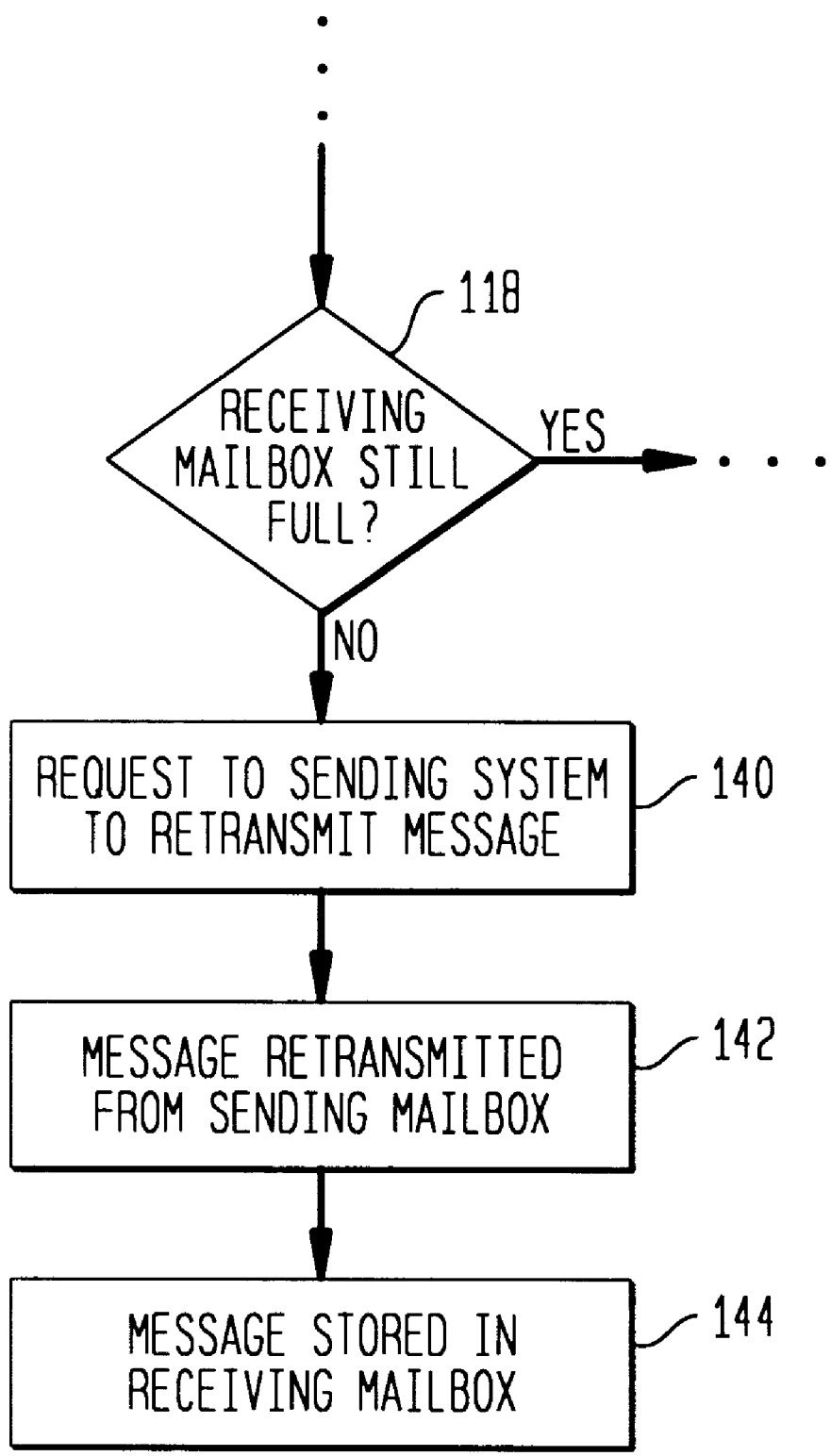
FIG. 4 is a process flowchart for a second embodiment of the present invention for off-system messaging.

FIG. 4 is a process flowchart for a second embodiment of the present invention for off-system messaging. An environment for off-system messaging is set forth in FIG. 2. As shown in FIG. 2, off-system messaging involves two different messaging systems. The two different messaging systems must share a common messaging protocol which supports the message tokens of the present invention. Steps 100–118 of FIG. 4 are the same as steps 100–118 in FIG. 3. At step 140, the receiving mailbox sends a request to the sending messaging system to redeliver the returned message. Again, as an alternative, the receiving messaging system can monitor the receiving mailbox and send the request for retransmission when the receiving mailbox leaves the full state. At step 142 the message is retransmitted from the sending mailbox. At step 144, the message is stored in the message queue of the receiving mailbox.

With the present invention, a message sending user may or may not know a message delivery problem has occurred when a message is returned from a full message mailbox. The sending user only becomes aware of the situation if the sending user checks for messages after the message has been returned but before it has been retransmitted to the receiving mailbox. Thus, in many cases, the present invention is transparent to the sending user. The retransmitting of the returned message to the no longer full receiving mailbox occurs automatically without any need for sending user intervention.

The present invention utilizes today's full mailbox feature more efficiently. The resources of the system are preserved, and the more automated message delivery simplifies message delivery for the message sending user.

We claim:

1. A method for delivering messages, comprising the following steps:

checking a state of a receiving mailbox, the receiving mailbox being coupled to a messaging system;

placing a message token in the receiving mailbox when the state of the receiving mailbox is full, the message token capable of identifying a location of a message in a sending mailbox;

automatically sending the message from the sending mailbox to the receiving mailbox when the receiving mailbox leaves the full state; and allowing the message sending user to cancel delivery of the message before the automatic sending of the message from the sending mailbox to the receiving mailbox when the receiving mailbox leaves the full state.

2. A system for delivering messages, comprising:

a messaging system, a message being created by the messaging system;

a first message mailbox coupled to the messaging system; and a second message mailbox being coupled to the messaging system, the second message mailbox being initially in a full state, wherein the message is initially sent to the second message mailbox and then sent to the first message mailbox for storage because of the full state of the second message mailbox;

wherein the message is later automatically sent from the first message mailbox to the second message mailbox when the second message mailbox leaves the full state; and wherein delivery of the message returned to the first message mailbox can be canceled by a sender until the message is later automatically sent from the first message mailbox to the second message mailbox when the second message mailbox leaves the full state.

3. A system for delivering messages, comprising:

a first messaging system, a message being created by the first messaging system;

a second messaging system; and a first message mailbox coupled to the first messaging system;

a second message mailbox being coupled to the second messaging system, the second message mailbox being initially in a full state, wherein the message is initially sent to the second message mailbox and then sent to the first message mailbox for storage because of the full state of the second message mailbox;

wherein the message is later automatically sent from the first message mailbox to the second message mailbox when the second message mailbox leaves the full state; and wherein delivery of the message returned to the first message mailbox can be canceled by a sender until the message is later automatically sent from the first message mailbox to the second message mailbox when the second message mailbox leaves the full state.

* * * * *